United States Patent Office 3,547,906
Patented Dec. 15, 1970

3,547,906
12,12' - CARBONYLBIS- AND 12,12' - THIOCARBON-
YLBIS-DERIVATIVES OF 6H - DIBENZ[b,f][1,4]
OXAZOCIN-11(12H)-ONES, 6H-DIBENZO[b,f][1,4]
THIAZOCIN - 11(12H) - ONES, 11,12 - DIHYDRO-
6H-DIBENZ[b,f][1,4]OXAZOCINES AND 11,12-DI-
HYDRO-6H-DIBENZO[b,f][1,4]THIAZOCINES
Harry Louis Yale, New Brunswick, N.Y., assignor to E. R.
Squibb & Sons, Inc., New York, N.Y., a corporation
of Delaware
No Drawing. Filed Apr. 3, 1967, Ser. No. 627,628
Int. Cl. C07d 87/54, 93/44
U.S. Cl. 260—239.3
9 Claims

ABSTRACT OF THE DISCLOSURE

This invention relates to the new compounds of the formula (I)

wherein X and X', each represents hydrogen, halogen, trihalomethyl, trihalomethoxy, trihalomethylmercapto, lower alkyl, lower alkoxy, lower alkylthio, lower alkanoyl, N,N-di-lower alkylsulfamyl and carbamoyl, Y is methylene or carbonyl and W and Z each is oxygen or sulfur; which are produced by the interaction of the cation (II)

with phosgene or thiophosgene in a nonprotic solvent. These products are useful as antiseptics, disinfectants, antidepressants, anticonvulsants and sedatives.

SUMMARY OF THE INVENTION

This invention relates to compounds having the Formula I above. In the formula, all four halogens are within the meaning of the symbols X and X' but chlorine and bromine are preferred. The trihalomethyl groups also include all halogens with trifluoromethyl and trichloromethyl, especially the former, being preferred. The same considerations apply to the trihalomethylmercapto groups. The lower alkyl, lower alkoxy, lower alkanoyl, lower alkylthio and di-lower alkyl sulfamyl groups all include straight and branched chain hydrocarbon radicals of less than eight carbon atoms, for example, methyl, ethyl, propyl, isopropyl, butyl, isobutyl, t-butyl, methoxy, ethoxy, propoxy, isopropoxy, acetyl, propionyl, methylmercapto, ethylmercapto, N,N-dimethylsulfamyl, N,N-diethylsulfamyl and the like. Y represents the methylene (—CH₂—) or carbonyl (C=O) group.

These compounds are produced by the reaction of a compound of the formula (III)

wherein the symbols have the same meaning as above, with sodium hydride, sodium amide, lithium amide, butyl lithium, sodium hydroxide, potassium hydroxide or the like, in a nonprotic solvent such as dimethylformamide, benzene, ethyleneglycol dimethylether, etc. to produce the anion.

(IV)

followed by reaction with phosgene or thiophosgene to yield the product of Formula I.

The starting materials of Formula III are produced by first reacting an unsubstituted or X-substituted o-halomethylbenzoic acid alkyl ester with an alkali metal salt of an unsubstituted or X'-substituted o-nitrophenol or o-nitrothiophenol in an organic solvent such as dimethylformamide. The resulting alkyl o-[o-nitrophenoxy]-methylbenzoate or alkyl o-[o-nitrophenylthio]methylbenzoate is hydrolyzed to obtain the corresponding free benzoic acid. The nitro group of the latter is reduced to an amino group. This product is cyclized, for example with N,N'-dicyclohexyl carbodiimide in ethyl acetate, to obtain the starting material of Formula III wherein Y is keto. The keto group may be reduced to the methylene group, for example, with lithium aluminum hydride in ether.

The new compounds of this invention are useful as antiseptics or disinfectants, e.g., for control of common air-borne environmental bacteria, Staphylococcus or Diplococcus, for example, in aqueous solutions, emulsions or suspensions of up to about 10% concentration. They are also useful as anti-depressants, anticonvulsants and sedatives in conventional oral dosage forms of about 10 mg. to 500 mg. per day.

The following examples are illustrative, all temperatures being on the centigrade scale.

Example 1.—12,12'-carbonylbis[6H-dibenz[b,f][1,4]
oxazocin-11(12H)-one]

To a suspension of 0.56 g. of a 50% dispersion of sodium hydride in oil and 100 ml. of toluene is added portionwise 2.25 g. of 6H-dibenz[b,f][1,4]oxazocin-11(12H)-one. Following the addition, the reaction mixture is stirred for three hours at room temperature, a solution of 1.0 g. of phosgene in 10 ml. of toluene is added dropwise and the stirring is continued for three hours to give about 0.9 g. of 12,12'-carbonylbis[6H-dibenz[b,f][1,4]oxazocin-11(12H)-one], M.P. about 275–277°, after recrystallization from toluene.

Example 2.—12,12'-carbonylbis[6H-dibenzo[b,f][1,4]
thiazocin-11(12H)-one]

By substituting 2.41 g. of 6H-dibenzo[b,f][1,4]thiazocin-11(12H)-one for the 6H-dibenz[b,f][1,4]oxazocin-11(12H)-one in Example 1, there is obtained about 0.8 g. of 12,12'-carbonylbis[6H-dibenzo[b,f][1,4]thiazocin-11(12)-one], M.P. about 244–246° after recrystallization from ethyl acetate.

Example 3.—12,12'-thiocarbonylbis[6H-dibenz[b,f][1,4]
oxazocin-11(12H)-one]

By substituting 1.1 g. of thiophosgene for the phosgene in Example 1, there is obtained about 0.65 g. of 12,12'-thiocarbonylbis[6H-dibenz[b,f][1,4]oxazocin - 11(12H)-one].

Example 4.—12,12'-thiocarbonylbis[6H-dibenzo[b,f]
[1,4]thiazocin-11(12H)-one]

By substituting 1.1 g. of thiophosgene for the phosgene in Example 2, there is obtained about 0.55 g. of 12,12'-thiocarbonylbis[6H-dibenzo[b,f][1,4]thiazocin-11(12H)-one].

EXAMPLE 5

By replacing the 6H - dibenz[b,f][1,4]oxazocin - 11 (12H)-one with the appropriately substituted 6H-dibenz[b,f][1,4]oxazocin-11(12H)-one in Example 1, the corresponding 12,12'-carbonylbis[substituted-6H-dibenz[b,f][1,4]oxazocin-11(12H)-one] is obtained.

Substituent (X or X') in 6H-dibenz[b,f][1,4]oxazocin-11-(12H)-one:

2-methyl
2-methoxy
2-methylthio
2-butylthio
2-chloro
2-trifluoromethyl
2-trifluoromethoxy
2-N,N-dimethylsulfamyl
2-carbamoyl
2-acetyl
3-methyl
3-methoxy
7-chloro
2-methyl, 7-chloro
2-trifluoromethylthio Substituent (X or X') in 12,12'-carbonylbis[6H-dibenz[b,f][1,4]oxazocin-11-(12H)-one]:

2-methyl
2-methoxy
2-methylthio
2-butylthio
2-chloro
2-trifluoromethyl
2-trifluoromethoxy
2-N,N-dimethylsulfamyl
2-carbamoyl
2-acetyl
3-methyl
3-methoxy
7-chloro
2-methyl, 7-chloro
2-trifluoromethylthio

Example 6

By replacing the 6H - dibenzo[b,f][1,4]thiazocin - 11 (12H)-one with the appropriately substituted-6H-dibenzo[b,f][1,4]thiazocin-11(12H)-one in Example 2, the corresponding 12,12'-carbonylbis[substituted - 6H - dibenzo[b,f][1,4]thiazocin-11(12H)-one] is obtained.

Substituent (X or X') in 6H-dibenzo[b,f][1,4]thiazocin-11(12H)-one:

2-methyl
2-methoxy
2-methylthio
2-butylthio
2-chloro
2-trifluoromethyl
2-trifluoromethoxy
2-N,N-dimethylsulfamyl
2-carbamoyl
2-acetyl
3-methyl
3-methoxy
7-chloro
2-methyl, 7-chloro
2-trifluoromethylthio Substituent (X or X') in 12,12'-carbonylbis[6H-dibenzo[b,f][1,4]thiazocin-11(12H)-one]:

2-methyl
2-methoxy
2-methylthio
2-butylthio
2-chloro
2-trifluoromethyl
2-trifluoromethoxy
2-N,N-dimethylsulfamyl
2-carbamoyl
2-acetyl
3-methyl
3-methoxy
7-chloro
2-methyl, 7-chloro
2-trifluoromethylthio Example 7.—6H-dibenz[b,f][1,4]oxazocin-11(12H)-one (a) To 103 g. of sodium o-nitrophenolate, 103 g. of sodium bromide, and 1100 ml. of N,N-dimethylformamide is added dropwise 186 g. of methyl 2-chloromethylbenzoate in 450 ml. of N,N-dimethylformamide, and the mixture heated about three hours at 85–90° to give about 147 g. of methyl o-[o-nitrophenoxy]methylbenzoate, M.P. about 109–111°.

(b) The product from (a), 144 g., suspended in 3600 ml. of 95% ethanol is stirred and refluxed for 10 minutes and then 31 g. of sodium hydroxide in 750 ml. of water is added as rapidly as possible. The refluxing is continued for an additional 10 minutes, the source of heat removed, and 92 ml. of concentrated hydrochloric acid in 750 ml. of water is added rapidly with vigorous stirring followed by 2100 ml. of water. The mixture is stirred, cooled, and the solid filtered to give about 126 g. of o-[o-nitrophenoxy]methylbenzoic acid, M.P. about 196–198°.

(c) The product from (b), 27 g., 200 ml. of 0.5 N sodium hydroxide and 2.0 g. of Raney nickel catalyst are stirred for 10 minutes under nitrogen, and filtered. To the filtrate is added 10 g. of Raney nickel catalyst and the mixture hydrogenated at 50 p.s.i. for three hours to give about 22 g. of o-[o-aminophenoxy]methylbenzoic acid, M.P. about 178–179°.

(d) The product from (c), 8.0 g., in 750 ml. of anhydrous ethyl acetate is cooled to 18° and 7.2 g. of N,N'-dicyclohexylcarbodiimide in 50 ml. of anhydrous ethyl acetate is added, and the mixture stirred for 24 hours to give about 2.7 g. of 6H - dibenz[b,f][1,4]oxazocin - 11 (12H)-one.

Example 8.—2-methyl-6H-dibenz[b,f][1,4]oxazocin-11 (12H)-one

By substituting 117 g. of sodium o-nitro-p-cresolate for the sodium o-nitrophenolate in Example 7(a) and then proceeding through steps (b), (c), and (d), there is obtained 2-methyl-6H-dibenz[b,f][1,4]oxazocin - 11(12H)-one.

Example 9.—2-methoxy-6H-dibenz[b,f][1,4]oxazocin-11(12H)-one

By substituting 133 g. of sodium o-nitro-p-methoxyphenolate for the sodium o-nitrophenolate in Example 7(a) and then proceeding through steps (b), (c) and (d), there is obtained 2-methoxy-6H-dibenz[b,f][1,4]oxazocin-11(12H)-one.

The o-nitro-p-methoxyphenol is prepared by the nitration of p-acetanisidine, separation of the o-nitro-p-acetanisidine, hydrolysis to o-nitro-p-anisidine, diazotization, and decomposition of the diazonium compound by water.

Example 10.—3-methyl-6H-dibenz[b,f][1,4]oxazocin-11(12H)-one

By substituting 117 g. of sodium o-nitro-m-cresol for the sodium o-nitrophenolate in Example 7(a) and then proceeding through steps (b), (c), and (d), there is obtained 3-methyl-6H-dibenz[b,f][1,4]oxazocin - 11(12H)-one.

EXAMPLE 11.—2-trifluoromethyl-6H-dibenz[b,f][1,4]oxazocin-11(12H)-one (a) By substituting 171 g. of sodium o-nitro-p-trifluoromethylphenol for the sodium o-nitrophenolate in Example 7(a) and then proceeding through steps (b), (c), and (d), there is obtained 2-trifluoromethyl-6H - dibenz[b,f][1,4] oxazocin-11(12H)-one.

(b) o-nitro-p-trifluoromethylphenol is prepared by the reaction of 3-nitro-4-chlorobenzotrifluoride with sodium methoxide to give 3-nitro-4-methoxybenzotrifluoride, followed by cleavage of the latter with pyridine hydrochloride.

Example 12.—2-(N,N-dimethylsulfamoyl)-6H-dibenz[b,f][1,4]oxazocin-11(12H)-one

By substituting 196 g. of sodium N,N-dimethyl-4-hydroxy-3-nitrobenzenesulfonamide for the sodium o-nitrophenolate in Example 7(a) and then proceeding through steps (b), (c), and (d), there is obtained 2-(N,N-dimethylsulfamoyl) - 6H - dibenz[b,f][1,4]oxazocin - 11(12H)-one.

The 4-hydroxy-3-nitrobenzenesulfonamide is obtained by the nitration of p-hydroxybenzenesulfonic acid followed by conversion of the m-nitro-p-hydroxybenzenesulfonic acid to m-nitro-p-acetoxybenzenesulfonic acid; the latter by treatment with thionyl chloride-N,N-dimethylformamide gives the sulfonyl chloride, and this, when treated with an excess of aqueous dimethylamine gives the desired 4-hydroxy-3-nitrobenzenesulfonamide.

Example 13.—3-methoxy-6H-dibenz[b,f][1,4]oxazocin-11(12H)-one

By substituting 133 g. of sodium 2-nitro-5-methoxyphenolate for the sodium o-nitrophenolate in Example 7(a) and then proceeding through steps (b), (c), and (d), there is obtained 3-methoxy-6H-dibenz[b,f][1,4]oxazocin-11(12H)-one.

The 2-nitro-5-methoxyphenol is prepared by the nitration of m-chloroanisole, separation of m-chloro-p-nitroanisole, and then reaction as in Example 11(b).

Example 14.—2-acetyl-6H-dibenz[b,f][1,4]oxazocin-11-(12H)-one

By substituting 131 g. of sodium o-nitro-p-acetylphenolate for the sodium o-nitrophenolate in Example 7(a) and then proceeding through steps (b), (c), and (d), there is obtained 2-acetyl-6H-dibenz[b,f][1,4]oxazocin-11(12H)-one.

The o-nitro-p-acetylphenol is obtained by rearrangement of o-nitrophenyl acetate.

Example 15.—12,12'-carbonylbis[11,12-dihydro-6H-dibenz[b,f][1,4]oxazocine]

(a) To 4.8 g. of lithium aluminum hydride in 1200 ml. of anhydrous ether under nitrogen is added portionwise 6.6 g. of 6H-dibenz[b,f][1,4]oxazocine-11(12H)-one. Subsequently, the reaction mixture is heated under reflux for two hours and worked up to give about 6 g. of 11,12-dihydro - 6H - dibenz[b,f][1,4]oxazocine, M.P. about 133–135° after recrystallization from Skellysolve E.

(b) By substituting 2.11 g. of the product from (a) for the 6H-dibenz[b,f][1,4]oxazocin-11(12H)-one in Example 1, there is obtained 12,12'-carbonylbis[11,12-dihydro-6H-dibenz[b,f][1,4]-oxazocine].

Example 16.—12,12'-thiocarbonylbis[2-trifluoromethyl-11,12-dihydro-6H-dibenz-[b,f][1,4]oxazocine]

(a) By substituting 8.1 g. of 2-trifluoromethyl-6H-dibenz-[b,f][1,4]oxazocine - 11(12H) - one for the 6H-dibenz[b,f][1,4]oxazocine - 11(12H) - one in Example 15(a), there is obtained about 7.4 g. of 2-trifluoromethyl-11,12-dihydro-6H-dibenz[b,f][1,4]-oxazocine.

(b) By substituting 1.1 g. of thiophosgene for the phosgene and 2.7 g. of the product from (a) for the 6H-dibenz[b,f][1,4]-oxazocine-11(12H)-one in Example 1, there is obtained about 1.0 g. of 12,12'-thiocarbonylbis-[2-trifluoromethyl - 11,12 - dihydro-6H-dibenz[b,f][1,4]oxazocine].

Example 17.—7-chloro-6H-dibenz[b,f][1,4]oxazocin-11(12H)-one (a) By substituting 222 g. of methyl 3-chloro-2-chloromethylbenzoate for the methyl 2-chloromethylbenzoate in Example 7(a), there is obtained, following the procedure of the steps 7(b), (c), and (d), 7-chloro-6H-dibenz[b,f][1,4]oxazocin-11(12H)-one.

(b) The chlorination of o-xylene gives 3-chloro-o-xylene; dilute nitric acid oxidation of the 3-chloro derivative gives a mixture of products from which m-chloro-o-toluic acid is isolated by distillation; the latter, following conversion to the methyl ester and treatment with sulfuryl chloride, gives the required methyl 3-chloro-2-chloromethylbenzoate.

Example 18.—2-methyl-7-chloro-6H-dibenz[b,f][1,4]oxazocin-11(12H)-one (a) Employing 222 g. of methyl 3-chloro-2-chloromethyl-benzoate, prepared as described in Example 17(b) and sodium-o-nitro-m-cresol and proceeding through steps 7(a), (b), (c), and (d), there is obtained 2-methyl-7-chloro-6H-dibenz[b,f][1,4]oxazocin-11(12H)-one.

Example 19.—2-trifluoromethylthio-6H-dibenz[b,f][1,4]oxazocin-11(12H)-one

The chlorination of p-chloromethylthiobenzene gives p-chloro-trichloromethylthiobenzene; the latter treated with antimony pentafluoride-antimony trifluoride-hydrogen fluoride gives p-chlorotrifluoromethylthiobenzene; the latter is treated with nitric acid-sulfuric acid to give 3-nitro-4-chloro-trifluoromethylthiobenzene. Substituting the latter in the procedure of Example 11(b) gives o-nitro-p-trifluoromethylthiophenol. Substituting the sodium salt of the last named compound for the sodium o-nitrophenolate in Example 7(a), and then proceeding as described in the rest of that example, there is obtained 2-trifluoromethylthio - 6H - dibenz[b,f][1,4]oxazocin-11-(12H)-one.

Example 20.—12,12'-carbonylbis[11,12-dihydro-6H-dibenzo[b,f][1,4]thiazocine]

By substituting 2.27 g. of 11,12-dihydro-6H-dibenzo-[b,f][1,4]thiazocine for the starting material in Example 1, there is obtained 12,12'-carbonylbis[11,12-dihydro-6H-dibenzo[b,f][1,4]thiazocine].

Example 21.—12,12'-thiocarbonylbis[11,12]-dihydro-6H-dibenzo[b,f][1,4]thiazocine]

By substituting 2.27 g. of 11,12-dihydro-6H-dibenzo-[b,f][1,4]thiazocine for the starting material in Example 1 and also substituting thiophosgene for the phosgene, there is obtained 12,12'-thiocarbonylbis[11,12]-dihydro-6H-dibenzo[b,f][1,4]thiazocine].

Example 22

By substituting for the 11,12-dihydro - 6H - dibenzo-[b,f][1,4]thiazocine in Examples 20 and 21, respectively, the appropriately substituted analogs as shown in Example 6, there are obtained the corresponding substituted 12,12'-carbonylbis- and 12,12'-thiocarbonylbis compounds.

What is claimed is:
1. A compound of the formula

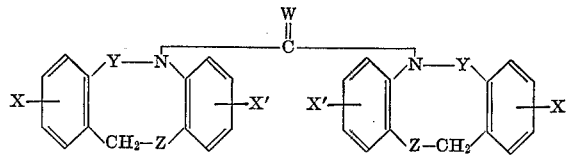

wherein
X and X' each is hydrogen, halogen, trifluoromethyl, trifluoromethoxy, trifluoromethylmercapto, lower alkyl, lower alkoxy, lower alkylthio,
Y is methylene or carbonyl and W and Z each is oxygen or sulfur.

2. A compound according to claim 1 wherein X and X' each is hydrogen.

3. A compound according to claim 1 wherein X is hydrogen and X' is halogen.

4. A compound according to claim 3 wherein the halogen is chlorine.

5. A compound according to claim 1 wherein X is hydrogen, X' is halogen, W and Z each is oxygen and Y is carbonyl.

6. A compound according to claim 5 wherein the halogen is chlorine.

7. A compound according to claim 1 wherein X is hydrogen, X' is trifluoromethyl, W and Z each is oxygen and Y is carbonyl.

8. A compound according to claim 1 wherein X and X' each is hydrogen, W and Z each is oxygen and Y is carbonyl.

9. A compound according to claim 1 wherein X is hydrogen, X' is halogen, W is oxygen, Y is carbonyl and Z is sulfur.

References Cited

FOREIGN PATENTS 1,217,958   6/1966   Germany _____ 260—327B

OTHER REFERENCES

Burger: "Medicinal Chemistry," 2nd edition, pp. 72–81 (Interscience) (1960).

HENRY R. JILES, Primary Examiner

R. T. BOND, Assistant Examiner

U.S. Cl. X.R.

260—327, 333; 424—244, 275